W. H. WATSON.
POULTRY FEEDER.
APPLICATION FILED SEPT. 27, 1909.
1,013,707.
Patented Jan. 2, 1912.
2 SHEETS—SHEET 1.
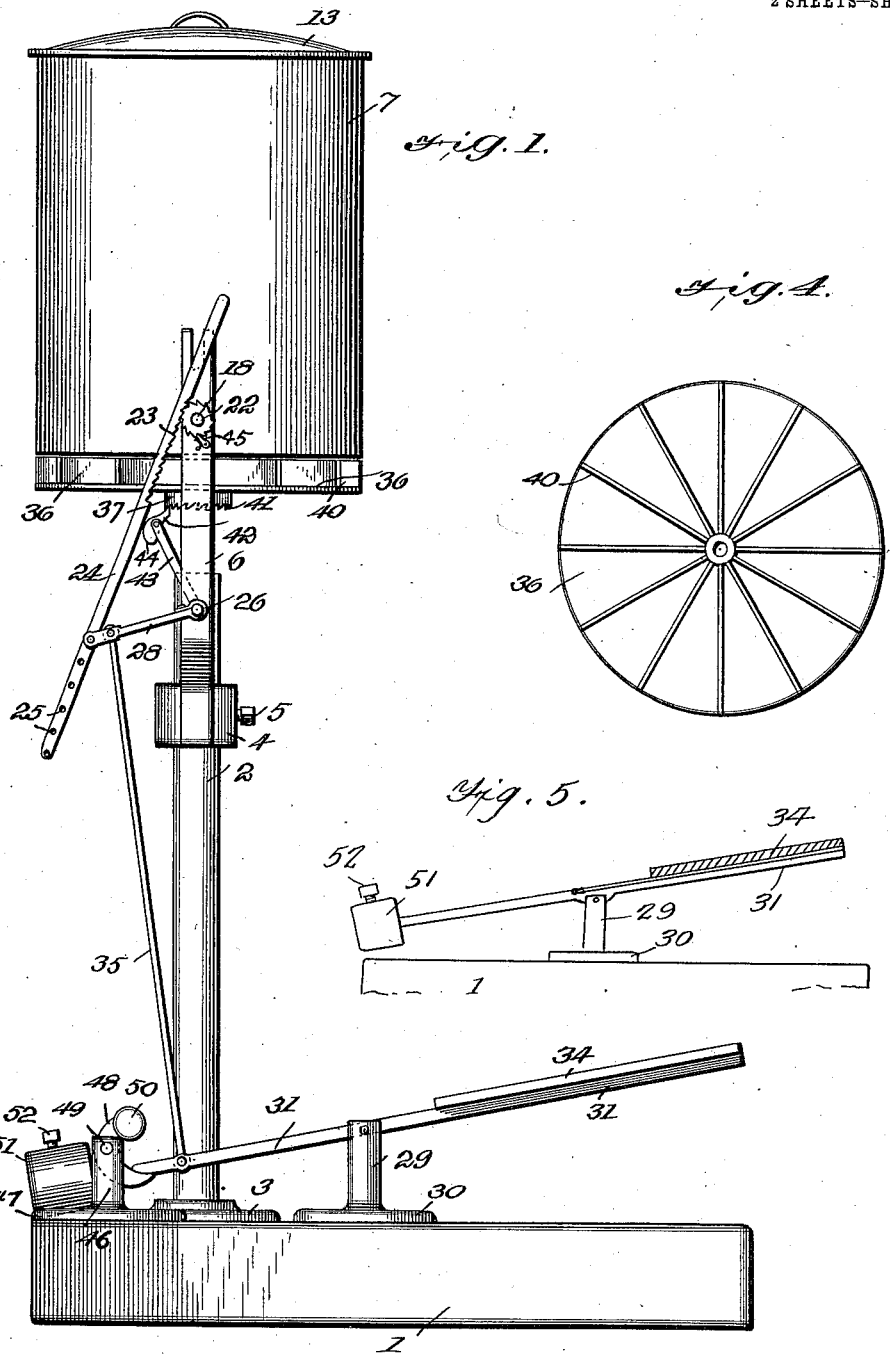
WITNESSES
INVENTOR
WILLIAM H. WATSON
BY
ATTORNEYS W. H. WATSON.
POULTRY FEEDER.
APPLICATION FILED SEPT. 27, 1909.
1,013,707.
Patented Jan. 2, 1912.
2 SHEETS—SHEET 2.
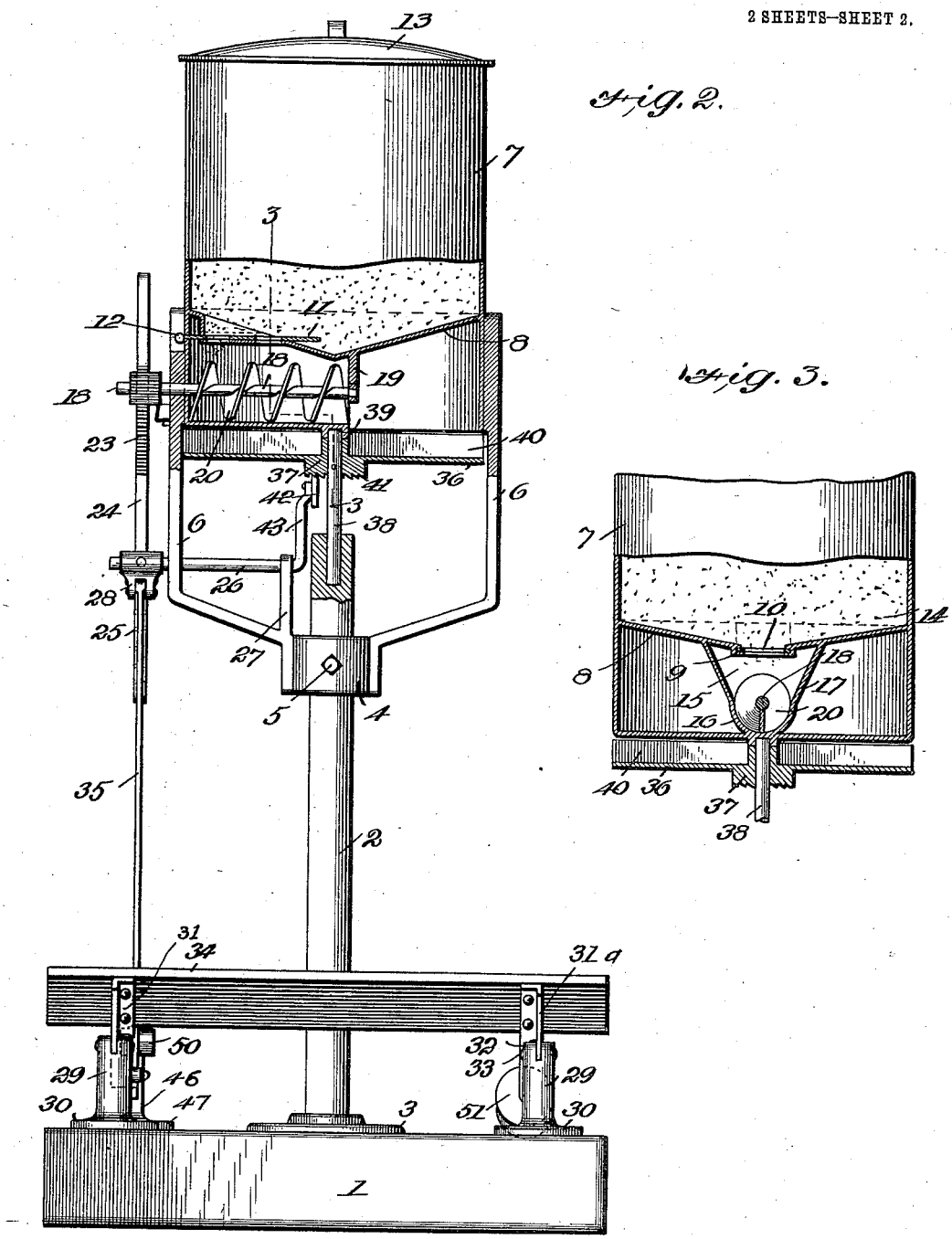
WITNESSES
INVENTOR
WILLIAM H. WATSON
BY
ATTORNEYS

UNITED STATES PATENT OFFICE.

WILLIAM H. WATSON, OF RIVERDALE, NEBRASKA.

POULTRY-FEEDER.

1,013,707. Specification of Letters Patent. Patented Jan. 2, 1912.

Application filed September 27, 1909. Serial No. 519,726.

*To all whom it may concern:*

Be it known that I, WILLIAM H. WATSON, a citizen of the United States, and a resident of Riverdale, in the county of Buffalo and State of Nebraska, have invented certain new and useful Improvements in Poultry-Feeders, of which the following is a specification.

My invention is an improvement in poultry feeders, and consists in certain novel constructions, and combinations of parts hereinafter described and claimed.

The object of the invention is to provide a device which will be an improvement over my co-pending application Serial No. 504,258, filed June 25, 1909.

Referring to the drawings forming a part hereof—Figure 1 is a side view of the improvement; Fig. 2 is a front view partly in section; Fig. 3 is a section on the line 3—3 of Fig. 2; Fig. 4 is a plan view of the distributer, and Fig. 5 is a side view of the weight and bar partly in section.

The embodiment of the invention shown in the drawings consists of a base 1, upon which is supported a standard 2, the standard having a foot 3, which is secured to the base in any suitable manner. A bearing sleeve 4 is slidable on the standard, and a set screw 5 is threaded through the sleeve and engages the standard to retain the sleeve in adjusted position. The sleeve is provided with arms 6, which extend outwardly and upwardly from the sleeve, and between the upper ends of the arms, a substantially cylindrical container 7 is supported. The bottom 8 of the container is hopper shaped as shown in Fig. 2, and at one side the bottom is provided with a horizontal flattened portion 9 through which is an opening 10. The opening is adapted to be closed by a sliding cover 11, and the cover is provided with a handle 12, extending outside of the container, for convenience in manipulating the cover. The container is also provided with a cover 13, and is adapted to contain the grain 14, or other material to be fed. A compartment 15 is arranged below the opening 10, the bottom 16 of which is rounded, and the sides 17 flaring, and a feed screw is journaled in the compartment. The feed screw consists of a shaft 18 journaled in one of the arms 6, and in a bracket 19 depending from the bottom of the container, and the shaft has secured thereto, a spiral vane 20. The inner end of the compartment 15 is open, as shown at 21, and delivers onto a distributer to be presently described in detail, and the outer end of the shaft is provided with a pinion 22, provided with ratchet teeth. The pinion meshes with teeth 23 on a rack bar 24, whose lower end is provided with a longitudinal series of openings 25. A shaft 26 is journaled in one of the arms 6, and in a bracket 27 on the arm, and a lever 28 is secured to the shaft outside of the arm, the outer end of the lever being detachably connected with one of the openings 25 of the rack bar. A pair of posts 29, each of which is provided with a foot 30 secured to the base 1, are arranged on each side of the standard 2, and a pair of levers 31 and 31ᵃ are journaled in a vertical slot 32, one in the top of each of the posts, by a bolt 33. The outer ends of the levers are connected by a platform 34, and a link 35 connects the inner end of the lever 31ᵃ with the lever 28 before mentioned.

The distributer before mentioned consists of a disk 36 provided with a hub 37, which is secured to the upper end of a stub shaft 38, the lower end of which is stepped in a socket in the upper end of the standard 2, while the upper end is journaled in a bearing 39 on the bottom of the compartment 15. The upper face of the disk is provided with a plurality of radial ribs 40, for a purpose to be presently described, and the lower edge of the hub is provided with a series of ratchet teeth 41, with which engages a pawl 42 pivoted to the end of a crank arm 43 integral with the inner end of the shaft 26. The end of the pawl 42 is weighted as shown at 44, to retain the pawl in engagement with the teeth, and a spring pressed pawl 45 engages the pinion 22 on the shaft 18. A post 46 is secured to the base by means of a foot 47, near the inner end of the lever 31, and a crescent shaped detent 48 is pivoted in the upper end of the post by a bolt 49. The free end of the lever 31 plays between the ends of the detent and the upper end is provided with a weight 50. A weight 51 is slidable on the inner end of the lever 31ᵃ, and is retained in adjusted position by a set screw 52. When the platform 34 is depressed, the opposite end of the lever 31 contacts with the weight 50, which is sufficiently heavy to check the movement of the lever in a yielding manner. When the fowl steps off the platform, the said end of the lever 31 engages the lower end of the lever 48, and is again checked in a yielding manner to prevent any jar.

In the operation of the device, the container 7 is provided with a suitable granular food and the weight 51 is properly adjusted to balance the platform and the parts operated thereby so that the weight of a fowl on the platform will depress the same. The sliding door or cover is then opened. When the fowl in its endeavor to reach the food in the container steps upon the platform 34, the platform will be depressed, and by means of the link 35 the rack bar will be moved longitudinally and the shaft 26 will be rocked or oscillated. The movement of the rack bar rotates the shaft 18 and a quantity of food is fed into the distributer by the feed screw. The oscillation of the shaft 26 swings the crank arm 43 and the pawl 42 by its engagement with the ratchet teeth rotates the disk, thus throwing the food in all directions. By loosening the set screw 5, the container may be raised or lowered to adjust the distributer with respect to the pawl and the rack bar may also be adjusted by engaging the lever 28 with different holes.

It will be evident that each time the platform is depressed a measured quantity of food is distributed, and the action of the device is positive. The feed screw always feeds and the operation of the device is not dependent upon gravity for the dropping of the food onto the distributer.

The fowls are always able to obtain food when hungry, but it is necessary for them to hunt it up when distributed, thus insuring that they get the necessary exercise to properly digest it.

I claim:

1. A poultry feeder, comprising a base, a standard thereon, a bearing sleeve slidable on the standard, and provided with upwardly extending arms, a set screw traversing the sleeve and engaging the standard, a substantially cylindrical container supported between the arms, said container having a hopper bottom, and an opening at one side thereof, a compartment below the opening having a rounded bottom and flaring sides, a feed screw journaled in the compartment, said screw being radial to the container, a ratchet wheel on the outer end of the shaft, a distributer comprising a disk having radial ribs on its upper face, a hub secured to the disk and a shaft to which the hub is secured, said shaft being journaled in the top of the standard and in the bottom of the container, said hub having ratchet teeth on its lower edge, a crank shaft journaled below the feed screw and provided at its inner end with a crank arm, a weighted pawl pivoted to the arm and engaging the ratchet teeth, a lever secured to the outer end of the crank shaft, a rack bar engaging the pinion of the feed screw, and connected with the lever, levers pivoted on the base, a platform connecting corresponding ends of the levers, and a link connecting one of said levers with the crank shaft lever.

2. A poultry feeder comprising a container and a compartment below the container, a distributer comprising a rotatable disk provided on its upper face with radial ribs, means for rotating the disk, a feed screw in the compartment and delivering to the disk, means for operating the screw, a movable platform, a connection between each of said means and the platform for operating the same when the platform is depressed, a counter-weight in connection with the platform, and means for adjusting the weight for the purpose specified.

3. A poultry feeder comprising a container and a compartment below the container, a distributer comprising a rotatable disk provided on its upper face with radial ribs, means for rotating the disk, a feed screw in the compartment and delivering to the disk, means for operating the screw, a movable platform, and a connection between each of said means and the platform for operating the same when the platform is depressed.

4. A poultry feeder comprising a casing having a compartment for the food, and a compartment therebelow to which the food compartment delivers, a feed screw in the lower compartment, a rotatable distributer below the feed screw to which it delivers, a movable platform and means operated by the movement of the platform for rotating the food screw and the distributer.

WILLIAM H. WATSON.

Witnesses:
GEORGE BURGERT,
FRANK W. TURNER.